United States Patent
Ludwig et al.

(10) Patent No.: US 10,875,445 B2
(45) Date of Patent: Dec. 29, 2020

(54) PIVOT BEARING FOR A PIVOTABLE HOLDER OF A LIGHT MODULE IN A CARRIER FRAME FOR A HEADLAMP

(71) Applicant: Hella GmbH & Co. KGaA, Lippstadt (DE)

(72) Inventors: Marco Ludwig, Hamm (DE); Gerd Pawliczek, Erwitte (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 7 days.

(21) Appl. No.: 16/334,188

(22) PCT Filed: Sep. 12, 2017

(86) PCT No.: PCT/EP2017/072860
§ 371 (c)(1),
(2) Date: Mar. 18, 2019

(87) PCT Pub. No.: WO2018/050624
PCT Pub. Date: Mar. 22, 2018

(65) Prior Publication Data
US 2019/0202338 A1 Jul. 4, 2019

(30) Foreign Application Priority Data
Sep. 19, 2016 (DE) .......... 10 2016 117 552

(51) Int. Cl.
*B60Q 1/068* (2006.01)
*F21S 41/657* (2018.01)
*B60Q 1/06* (2006.01)
*F21S 41/19* (2018.01)

(52) U.S. Cl.
CPC ............ *B60Q 1/068* (2013.01); *B60Q 1/06* (2013.01); *F21S 41/19* (2018.01); *F21S 41/192* (2018.01); *F21S 41/657* (2018.01)

(58) Field of Classification Search
CPC ............................ B25B 15/005; B60Q 1/06
See application file for complete search history.

(56) References Cited

U.S. PATENT DOCUMENTS

| 6,550,947 B1 | 4/2003 | Kibayashi | |
| 2002/0001199 A1* | 1/2002 | Dinant | B60Q 1/0683 362/514 |
| 2003/0223245 A1* | 12/2003 | Abe | B60Q 1/0683 362/523 |
| 2013/0301242 A1* | 11/2013 | Sharrah | F21V 21/084 362/105 |

FOREIGN PATENT DOCUMENTS

| DE | 102013104190 A1 | 10/2014 |
| EP | 1150064 A1 | 10/2001 |
| EP | 2762358 A2 | 8/2014 |

OTHER PUBLICATIONS

International Search Report and Written Opinion dated Nov. 29, 2017 from corresponding PCT Application.

* cited by examiner

*Primary Examiner* — Joseph L Williams
*Assistant Examiner* — Jacob R Stern
(74) *Attorney, Agent, or Firm* — Husch Blackwell LLP

(57) ABSTRACT

A bearing configuration is disclosed, particularly for a pivotable holder of a light module in a carrier frame for a headlamp. A detent bearing element is provided that is positioned on the light module and that has a pivot bearing section that is held by the formation of a latch mechanism in a bearing shell formed on the carrier frame.

4 Claims, 3 Drawing Sheets

PIVOT BEARING FOR A PIVOTABLE HOLDER OF A LIGHT MODULE IN A CARRIER FRAME FOR A HEADLAMP

CROSS REFERENCE

This application claims priority to PCT Application No. PCT/EP2017/072860, filed Sep. 12, 2017, which itself claims priority to German Patent Application 10 2016 117552.8, filed Sep. 19, 2016, the entirety of both of which are hereby incorporated by reference.

FIELD OF THE INVENTION

This invention concerns a bearing configuration, particularly for a pivotable holder of a light module in a carrier frame for a headlamp. The invention also concerns bearing configurations that are positioned between a carrier frame and a housing for a headlamp, where a pivotable holder of a carrier frame in the housing is comparable to and, as defined by the invention, is equivalent to a pivotable configuration of a light module in or on a carrier frame for a headlamp. Accordingly, every form of a pivotable holder of a component directly or indirectly in the housing of a headlamp constitutes the bearing configuration as defined by this invention.

BACKGROUND

DE 10 2013 104 190 A1 discloses a bearing configuration for a pivotable holder of a module assembly in a housing of a headlamp. The bearing configuration includes a screw-type bearing element so that the bearing element can hold a pivot pin on the light module. To enable installation of the bearing element, the bearing element is screwed to the carrier frame using a screw connection. For this purpose, the bearing elements are first put on bearing pins of the light module so that afterwards they can be screwed to the carrier frame in a different installation direction together with the light module.

Bearing configurations formed by a screw connection are elaborate and require tools for the installation. Furthermore, the bearing configuration provides no compensation for bearing play. For example, bearing clearance between the bearing element and the pin on the light module cannot be compensated for. Another disadvantage is that the bearing element that is used can find application only for a special configuration of a light module in a carrier frame; in other words, use of the bearing element requires the carrier frame to have a specially prepared holder geometry.

SUMMARY OF THE INVENTION

The purpose of the invention is to simplify the bearing element, particularly for a pivotable holder of a light module in a carrier frame for a headlamp or for a pivotable holder of a carrier frame in the housing of a headlamp. In particular, it is the purpose of the invention to improve the bearing configuration so that it can be installed easily.

The invention includes the technical contribution of a detent bearing element that is positioned on the light module and has a pivot bearing section that is held by the formation of a latch mechanism in a bearing shell formed on a carrier frame.

The core idea of the invention is an embodiment of a bearing configuration that has no play and is easy to install without the aid of any additional tools. The detent bearing element can be easily latched on the carrier frame, and thanks to arrangement of the detent bearing element on the light module in advance, the bearing configuration is already ready to use. Forming the actual bearing connection by means of the pivot bearing section for positioning in the bearing shell enables manual joining, because the pivot bearing section can be easily inserted into the bearing shell. The latch mechanism is designed so that the pivot bearing section captively remains in the bearing shell on the carrier frame. In addition, an advantage is achieved whereby a latch mechanism can minimize and, preferably, completely eliminate residual bearing play, because the latch mechanism is designed using spring elements. The spring elements are continuously pressing the pivot bearing section of the detent bearing element into the bearing shell on the carrier frame. This results in a pivotable holder of the light module on the carrier frame without the need for any additional joining elements such as screws, brackets or the like. The particular advantage here is that the detent bearing element can be manufactured as one piece from a cost-effective plastic material using injection molding.

The bearing configuration design as defined by this invention particularly provides for the detent bearing element to include a latch lug that latches on to a latch mating surface when the pivot bearing section is inserted in the bearing shell. Consequently, the pivot bearing section does not latch in the bearing shell, since the bearing shell, for example, has an enclosing angle of more than 180° for enclosing the pivot bearing section. Rather, the latch lug is positioned separately on the detent bearing element and it engages with the carrier frame. For example, the counter bearing surface can be formed on a rear side of the bearing shell, e.g. on a side of the bearing shell opposite the holder for the pivot bearing section. On the rear side of the bearing shell, the latch mating surface has a radius around a center point, which matches the center point of the bearing shell and, as such, also matches the pivot bearing section. Now, if the light module in the carrier frame pivots, then the latch lug moves along the rear side of the bearing shell and slides down it. Ideally, the latch lug remains under tension against the latch mating surface on the rear side of the bearing shell to ensure that the bearing section always remains pressed into the bearing shell. In particular, this can ensure a play-free arrangement of the pivot bearing section in the bearing shell, even for various rotational positions.

Advantageously, the detent bearing element can have a U-shaped extension that extends away from the pivot bearing section and has the latch lug positioned on it. This is used to grip the rear side of the carrier frame with the latch lug from behind. As a result, the bearing shell on the carrier frame forms a crescent-shaped section. On a side facing towards the rotation axis of the light module, the bearing shell has a sliding surface to the sliding holder of the pivot bearing section, and the latch mating surface is on the side facing the center point on the rear side.

In order to guide the latch lug in a spring-loaded position on the detent bearing element to the rear side of the bearing shell, the U-shaped extension is provided on the detent bearing element, which extends away from the pivot bearing section and, as a result, grips the rear side of the bearing shell from behind.

Another advantage is that the pivot bearing section includes a spring tongue segment that is positioned against the inner sliding surface of the bearing shell and acts as a spring. The spring tongue segment is used to further tension the pivot bearing section in the bearing shell so that the pretensioning of the spring tongue segment counteracts the spring tension in the latch lug of the detent bearing element. In other words, the crescent-shaped section of the bearing shell on the carrier frame is tensioned between the spring tongue element on the inside and the latch lug on the outside and the rear side.

Another advantage is that the detent bearing element has a holder designed in the pivot bearing section in which a lug that is inserted on the light module can be used to position the detent bearing element on the light module. For example, an open cross-section of the holder in the detent bearing element can have a rectangular shape, where a supplementally formed lug that is molded onto the light module can be inserted into the holder. Here, it is sufficient to form the holder from one side such that it is open to ensure that, for example, the detent bearing elements can be attached to two lugs opposite each other on the light module in order to then engage the light module together with the detent bearing elements on the carrier frame. The detent bearing elements are attached to the lugs of the light module from a lateral joining direction, and the light module is engaged together with the attached detent bearing elements on the carrier frame in a joining direction that runs vertically relative to the pivot axis direction of the light module in the carrier frame.

It is also advantageous if the detent bearing element is formed as one piece and constitutes a bearing interface between the light module and the carrier frame. Another advantage is that the detent bearing element is formed from a POM plastic and/or is manufactured using an injection molding process.

The invention is still based on a detent bearing element to the pivotable holder of a light module in a carrier frame for a headlamp, where the detent bearing element has a pivot bearing section that can be held by the formation of a latch mechanism of a latch lug in a bearing shell formed on a carrier frame.

Preferably, the inventive detent bearing element is formed from a POM plastic and manufactured using an injection molding process. A particular embodiment of the detent bearing element is designed such that it is manufactured as a single piece and forms a simple bearing interface between the light module and the carrier frame. Preferably, the detent bearing element has a holder that is inserted into the pivot bearing section, where a lug of the light module is inserted into the holder. If the detent bearing element is positioned on the light module and the light module in the carrier frame pivots, then the detent bearing element also pivots together with the light module in the carrier frame.

In addition, the inventive detent bearing element preferably has a U-shaped extension that extends away from the pivot bearing section and has a latch lug positioned on it.

With respect to other advantageous embodiments of the inventive detent bearing element, the embodiments of the inventive bearing configuration shall apply accordingly.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION OF THE DRAWINGS

Figure 1:
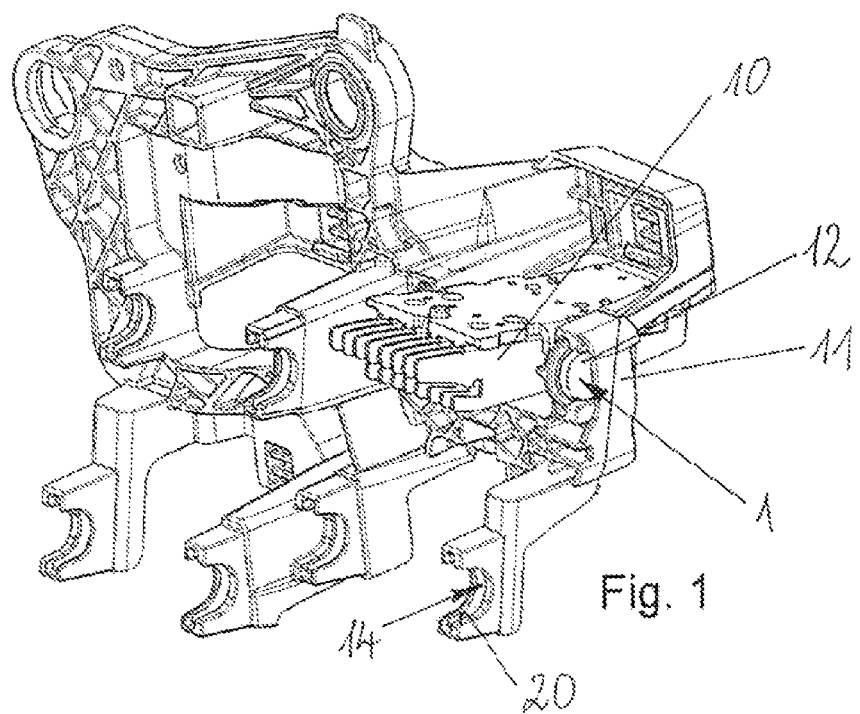
FIG. 1 is a perspective schematic view of a bearing configuration to the pivotable holder of a light module in a carrier frame, where the bearing configuration has an inventive detent bearing element.

FIG. 1 shows a perspective schematic view of a carrier frame 11 in which several light modules can be positioned where, for example, a light module 10 is held by the formation of a bearing configuration 1 on the carrier frame 11. The bearing configuration 1 includes the inventive detent bearing element 12, where the arrangement is depicted in a fully installed state. Another detent bearing element for forming a second bearing position of the light module 10 in the carrier frame 11 is on a side of the light module 10 opposite the bearing configuration 1.

The light module 10 is mounted through the two bearing configurations and around the pivot axis that runs transversely such that it can pivot. Here, the pivot axis is defined by an axis, which runs through the bearing configuration shown in FIG. 1 and the other bearing configuration 1 that is not depicted.

Figure 2:
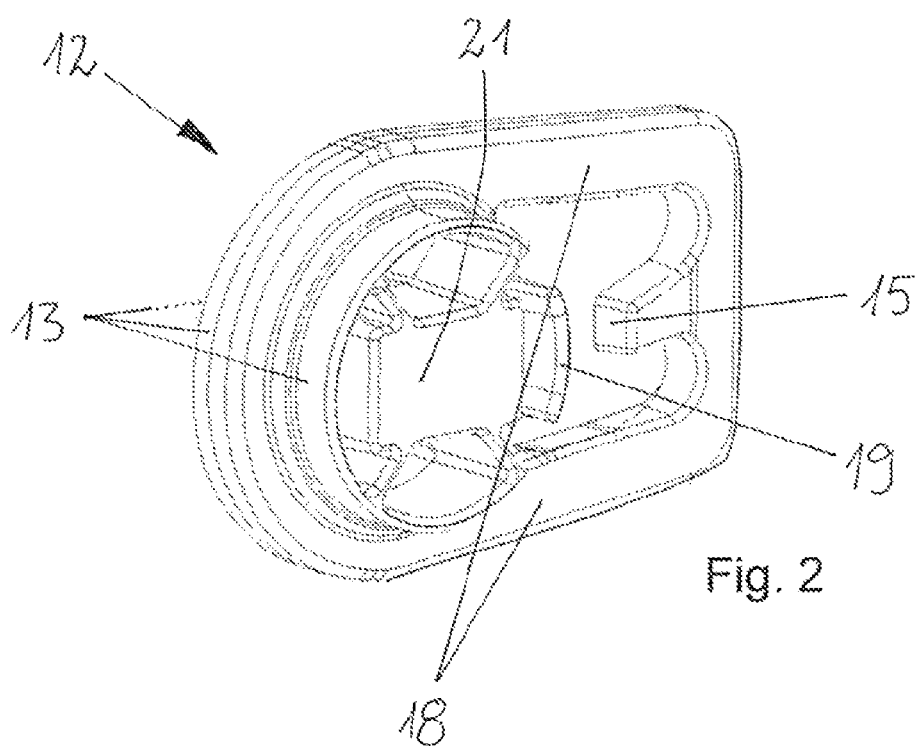
FIG. 2 is a perspective schematic view of the detent bearing element.

FIG. 2 shows a perspective schematic view of the detent bearing element 12 which, for example, is manufactured from a POM plastic in an injection molding process. As a vital structural component, the detent bearing element 12 has a pivot bearing section 13. A holder 21 is located in the center of the pivot bearing section 13.

In the embodiment shown in FIG. 2, a lug provided on the light module can be inserted into the rear of the holder 21, which can be used to attach the detent bearing element 12 to the side of the light module 10.

From the pivot bearing section 13, a U-shaped extension 18 extends to the rear, where the U-shaped extension 18 is roughly U-shaped.

In the U-shaped extension 18, a latch lug 15 that extends from a center branch of the U-shaped extension 18 towards the pivot bearing section 13. On the side facing towards the latch lug 15, the pivot bearing section 13 has a spring tongue segment 19, which creates elastic compliance in the pivot bearing section 13.

Figure 3:
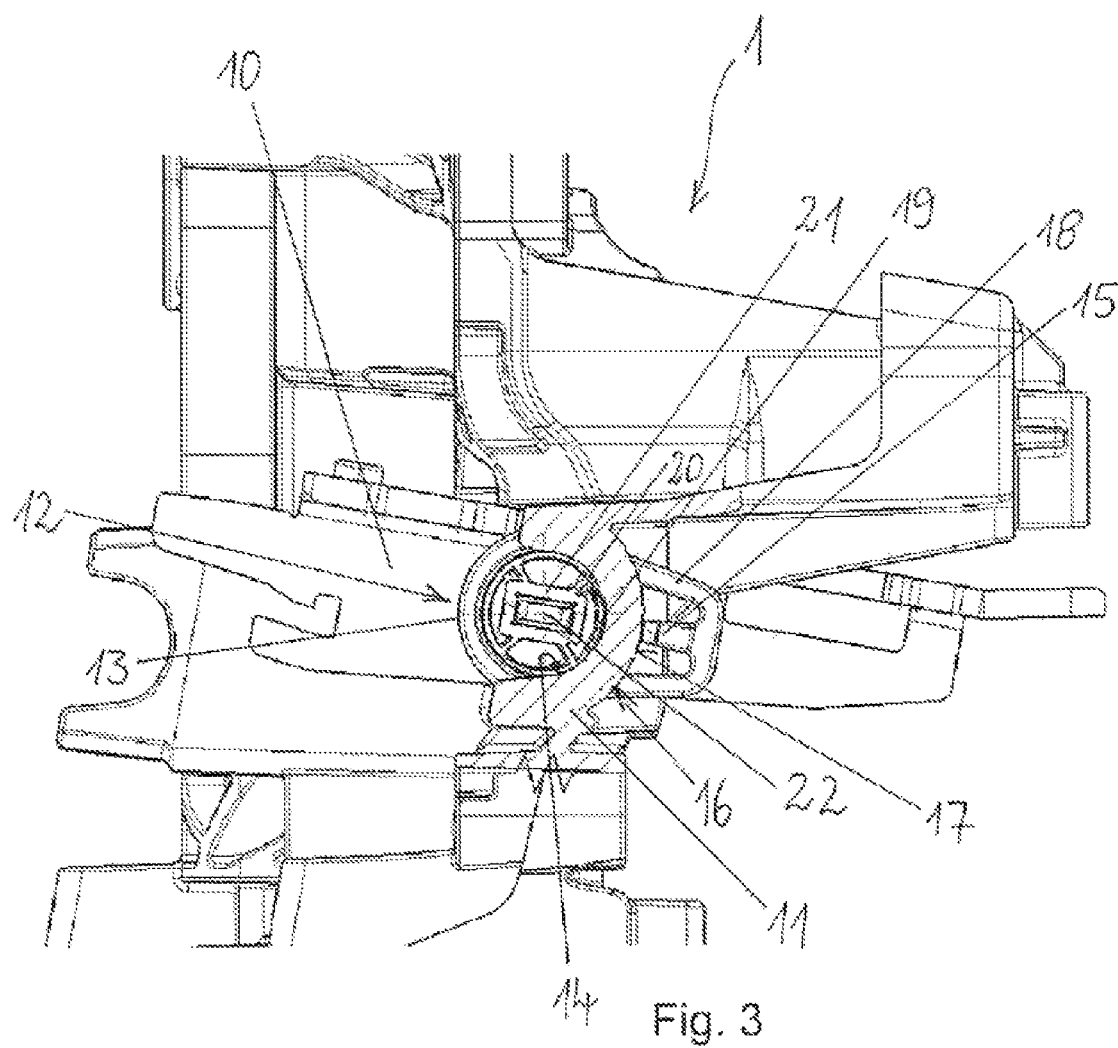
FIG. 3 is a side view of the bearing configuration of the light module on the carrier frame with the detent bearing element.

FIG. 3 shows the inventive bearing configuration 1, particularly for a pivotable holder of the light module 10 in a carrier frame 11 for a headlamp for a vehicle. On the carrier frame 11, a somewhat semicircular, crescent-type bearing shell 14 is formed into which the pivot bearing section 13 of the detent bearing element 12 is inserted in the sliding surface 20. In this process, the U-shaped extension 18 with the latch lug 15 moves to the rear of the crescent-shaped bearing shell 14, and the latch lug 15 can engage in the bearing shell 14 against the rear side 17 of the bearing shell 14 if the pivot bearing section 13 is fully inserted. As a result, the rear side 17 forms a latch mating surface 16, and the latch lug 15 engages on the rear side of the bearing shell 14, which means that the detent bearing element 12 is positioned in the bearing shell 14 captively. In this process, the U-shaped extension 18, just like the latch lug 15, has a spring-loaded part of the detent bearing element 12, and the U-shaped extension 18 with the latch lug 15 moves to the rear of the bearing shell 14, which is why the bearing shell 14 has lateral clearance.

If the light module 10 is pivoted together with the latch mating surface 12 that is attached to it such that it is torque-proof, then the tip of the latch lug 15 slides down the latch mating surface 16 to ensure that rear side 17 of the bearing shell 14 has a center of the circle that matches the center of the circle of the sliding surface 20, which is advantageous.

In the process, the detent bearing element 12 can be easily removed from the carrier frame 11 together with the light module 10. For this purpose, just the latch lug 15 with the U-shaped extension 18 has to be pushed back to ensure that the detent bearing element 12 can be removed again in the opening direction of the bearing shell 14.

A spring tongue segment 19 of the pivot bearing section 13 further tensions the pivot bearing section 13 in the bearing shell 14. This is done by tensioning the bearing shell 14 between the spring tongue segment 19 and the latch lug 15 properly. However, an adequate bracket segment can still be rotated to ensure that the detent bearing element 12 can be pivoted together with the light module 10 in the carrier frame 11. For torsion-resistant arrangement of the detent bearing element 12 on the light module 10, the light module 10 has a lug 22 that is held free of play in a holder 21. The holder 21 is formed on the detent bearing element 12 and, for example, is located in the pivot bearing section 13.

The design of the invention is not limited to the preferred embodiments specified here. Rather, a number of variants are conceivable, which make use of the present solution also in designs of a fundamentally different type. All of the features and/or advantages arising from the claims, description or drawings, including design details, physical layout and process steps, may be vital to the invention both by themselves and in a wide variety of combinations.

REFERENCE NUMERAL LIST

1 Bearing configuration
10 Light module
11 Carrier frame
12 Detent bearing element
13 Pivot bearing section
14 Bearing shell
15 Latch lug
16 Latch mating surface
17 Rear side
18 U-shaped extension
19 Spring tongue segment
20 Sliding surface
21 Holder
22 Lug

The invention claimed is:

1. A bearing configuration for a light module for a headlamp, the bearing configuration comprising:
   a carrier frame supporting the light module, the carrier frame comprising:
      a bearing shell formed on the carrier frame, the bearing shell including a rear side that forms a first mating surface; and
   a detent bearing element selectively engageable with the carrier frame, the detent bearing element comprising:
      a pivot bearing section that is selectively receivable within an inner surface of the bearing shell;
      a U-shaped extension that extends outwardly from the pivot bearing section; and
      a latch lug protruding from the U-shaped extension toward the pivot bearing section forming a second mating surface; and
   wherein when the detent bearing element is engaged with the carrier frame, the first mating surface and the second mating surface are mated with one another.

2. The bearing configuration according to claim 1, wherein the pivot bearing section includes a spring tongue segment that makes contact with a sliding surface of the bearing shell and acts as a spring.

3. The bearing configuration according to claim 1, wherein the detent bearing element is formed as one piece and constitutes a bearing interface between the light module and the carrier frame.

4. The bearing configuration according to claim 1, wherein the detent bearing element has POM plastic and/or is manufactured using an injection molding process.

* * * * *